(12) United States Patent
Mori et al.

(10) Patent No.: US 10,985,949 B2
(45) Date of Patent: Apr. 20, 2021

(54) TRANSMISSION CONTROL DEVICE, RECEPTION CONTROL DEVICE, AND TRANSMISSION/RECEPTION CONTROL SYSTEM

(71) Applicant: SONY SEMICONDUCTOR SOLUTIONS CORPORATION, Kanagawa (JP)

(72) Inventors: Atsushi Mori, Kanagawa (JP); Toshihisa Hyakudai, Kanagawa (JP); Hiroshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/475,304

(22) PCT Filed: Oct. 18, 2017

(86) PCT No.: PCT/JP2017/037697
§ 371 (c)(1),
(2) Date: Jul. 1, 2019

(87) PCT Pub. No.: WO2018/131242
PCT Pub. Date: Jul. 19, 2018

(65) Prior Publication Data
US 2019/0342125 A1 Nov. 7, 2019

(30) Foreign Application Priority Data
Jan. 16, 2017 (JP) .................................. 2017-004985

(51) Int. Cl.
*H04L 25/02* (2006.01)
(52) U.S. Cl.
CPC ........ *H04L 25/0272* (2013.01); *H04L 25/028* (2013.01); *H04L 25/0292* (2013.01)

(58) Field of Classification Search
CPC . H04L 25/0272; H04L 25/0292; H04L 25/02; H04L 25/4908; H04L 25/028;
(Continued)

(56) References Cited

U.S. PATENT DOCUMENTS 5,099,497 A * 3/1992 Ohno .................. H04L 25/4919
375/292
5,903,613 A * 5/1999 Ishida ................. G06F 13/4072
370/242

(Continued)

FOREIGN PATENT DOCUMENTS

| JP | 49-102219 A | 9/1974 |
|----|-------------|--------|
| JP | 63-037737 A | 2/1988 |
| JP | 06-085796 A | 3/1994 |

OTHER PUBLICATIONS

International Search Report and Written Opinion of PCT Application No. PCT/JP2017/037697, dated Jan. 16, 2018, 06 pages of ISRWO.

*Primary Examiner* — Sophia Vlahos
(74) *Attorney, Agent, or Firm* — Chip Law Group

(57) ABSTRACT

It is desirable to provide a technology capable of supporting reverse connection in which the front and back of a connector are reversed while expansion of circuit scale is suppressed. A reception control device is provided including a polarity detection unit that detects, as a polarity determination result signal, at least one of a polarity of a first reception signal received by a first reception unit or a polarity of a polarity inversion result of a second reception signal received by a second reception unit and a reception control unit that controls output destinations of a third reception signal received after the first reception signal by the first reception unit and a fourth reception signal received (Continued)

after the second reception signal by the second reception unit, on the basis of the polarity determination result signal.

18 Claims, 13 Drawing Sheets

(58) Field of Classification Search
CPC ......... H04L 27/22; H04L 27/06; H04L 27/14; H04L 27/38; G09G 3/3614; G09G 2310/0297

See application file for complete search history.

(56) References Cited

U.S. PATENT DOCUMENTS

| | | | | |
|---|---|---|---|---|
| 9,219,509 | B1* | 12/2015 | Ware | H04B 1/10 |
| 9,577,372 | B1* | 2/2017 | Kakish | H01R 13/6205 |
| 2009/0219072 | A1* | 9/2009 | Sobue | H04L 25/0282 |
| | | | | 327/199 |
| 2009/0274245 | A1* | 11/2009 | Brown | G11C 7/1069 |
| | | | | 375/340 |
| 2009/0296859 | A1* | 12/2009 | Faulhaber | H04L 25/0274 |
| | | | | 375/340 |
| 2011/0167189 | A1* | 7/2011 | Matsubara | G06F 3/0658 |
| | | | | 710/308 |
| 2011/0267936 | A1* | 11/2011 | Lee | H04B 3/32 |
| | | | | 370/201 |
| 2013/0251363 | A1* | 9/2013 | Joffe | G01M 11/3118 |
| | | | | 398/28 |
| 2016/0380721 | A1* | 12/2016 | Schultz | H04L 25/49 |
| | | | | 375/296 |
| 2017/0134152 | A1* | 5/2017 | Yamamoto | H04L 25/0264 |

* cited by examiner

FIG. 5

| | | | | | | |
|---|---|---|---|---|---|---|
| ORIGINAL SIGNAL | ... | K28.5(+) | D10.2(0x4B) | ... | K28.5(−) | D10.2(0x4B) |
| | | 1100000101 | 0101010101 | | 0011111010 | 0101010101 | ...

| | | | | | | |
|---|---|---|---|---|---|---|
| POLARITY INVERSION SIGNAL | ... | K28.5(−) | D21.5(0xB5) | ... | K28.5(+) | D21.5(0xB5) |
| | | 0011111010 | 1010101010 | | 1100000101 | 1010101010 | ...

TRANSMISSION CONTROL DEVICE, RECEPTION CONTROL DEVICE, AND TRANSMISSION/RECEPTION CONTROL SYSTEM

CROSS REFERENCE TO RELATED APPLICATIONS

This application is a U.S. National Phase of International Patent Application No. PCT/JP2017/037697 filed on Oct. 18, 2017, which claims priority benefit of Japanese Patent Application No. JP 2017-004985 filed in the Japan Patent Office on Jan. 16, 2017. Each of the above-referenced applications is hereby incorporated herein by reference in its entirety.

TECHNICAL FIELD

The present disclosure relates to a transmission control device, a reception control device, and a transmission/reception control system.

BACKGROUND ART

In recent years, high-definition multimedia interface (HDMI), display port (hereinafter, also simply referred to as "DP"), and the like are known as interfaces for connection between devices. The HDMI, the DP, and the like do not support reverse connection in which the connector is rotated 180 degrees and the front and back of the connector are reversed, and the connector and the receptor cannot be mechanically connected together.

Furthermore, universal serial bus (USB) is also known as an interface for connection between devices. The USBs except for the type-C do not support the reverse connection similarly to the HDMI and the like, but type-C of the USB supports the reverse connection. However, in the type-C, the reverse connection is detected by the CC1 signal and the CC2 signal. In other words, in the type-C, a reverse connection detection lane is added separately from a data transmission lane.

However, to suppress expansion of circuit scale, there is a need for a technology that supports the reverse connection of the connector without adding the reverse connection detection lane. Thus, as an example, a technology has been devised in which polarity inversion of a differential signal is detected and polarity is changed on the basis of a detection result (for example, see Patent Document 1).

CITATION LIST

Patent Document

Patent Document 1: Japanese Patent Application Laid-Open No. H6-85796

SUMMARY OF THE INVENTION

Problems to be Solved by the Invention

However, it is desirable that a technology is provided capable of supporting the reverse connection in which the front and back of the connector are reversed while the expansion of the circuit scale is suppressed.

Solutions to Problems

According to the present disclosure, a reception control device is provided including: a polarity detection unit that detects, as a polarity determination result signal, at least one of a polarity of a first reception signal received by a first reception unit or a polarity of a polarity inversion result of a second reception signal received by a second reception unit; and a reception control unit that controls output destinations of a third reception signal received after the first reception signal by the first reception unit and a fourth reception signal received after the second reception signal by the second reception unit, on the basis of the polarity determination result signal.

According to the present disclosure, a transmission control device is provided including: a first transmission unit that transmits a first transmission signal; and a second transmission unit that transmits a polarity inversion result of a second transmission signal, in which output destinations of the first transmission signal and the second transmission signal in a reception device are controlled on the basis of at least one of a polarity of the first transmission signal or a polarity of the polarity inversion result of the second transmission signal.

According to the present disclosure, a transmission/reception control system is provided including: a transmission control device including a first transmission unit that transmits a first transmission signal, and a second transmission unit that transmits a polarity inversion result of a second transmission signal; and a reception control device including a polarity detection unit that detects, as a polarity determination result signal, at least one of a polarity of a first reception signal received by a first reception unit or a polarity of a polarity inversion result of a second reception signal received by a second reception unit, and a reception control unit that controls output destinations of a third reception signal received after the first reception signal by the first reception unit and a fourth reception signal received after the second reception signal by the second reception unit, on the basis of the polarity determination result signal.

Effects of the Invention

As described above, according to the present disclosure, the technology is provided capable of supporting the reverse connection in which the front and back of the connector are reversed while the expansion of the circuit scale is suppressed. Note that, the above-described effect is not necessarily limited, and in addition to the above-described effect, or in place of the above-described effect, any of effects described in the present specification, or other effects that can be grasped from the present specification may be exhibited.

BRIEF DESCRIPTION OF DRAWINGS

FIG. 5 is a diagram for explaining an example of a polarity inversion detection pattern in a case where 8b10b is used as a coding method.

MODE FOR CARRYING OUT THE INVENTION

Figure 1:
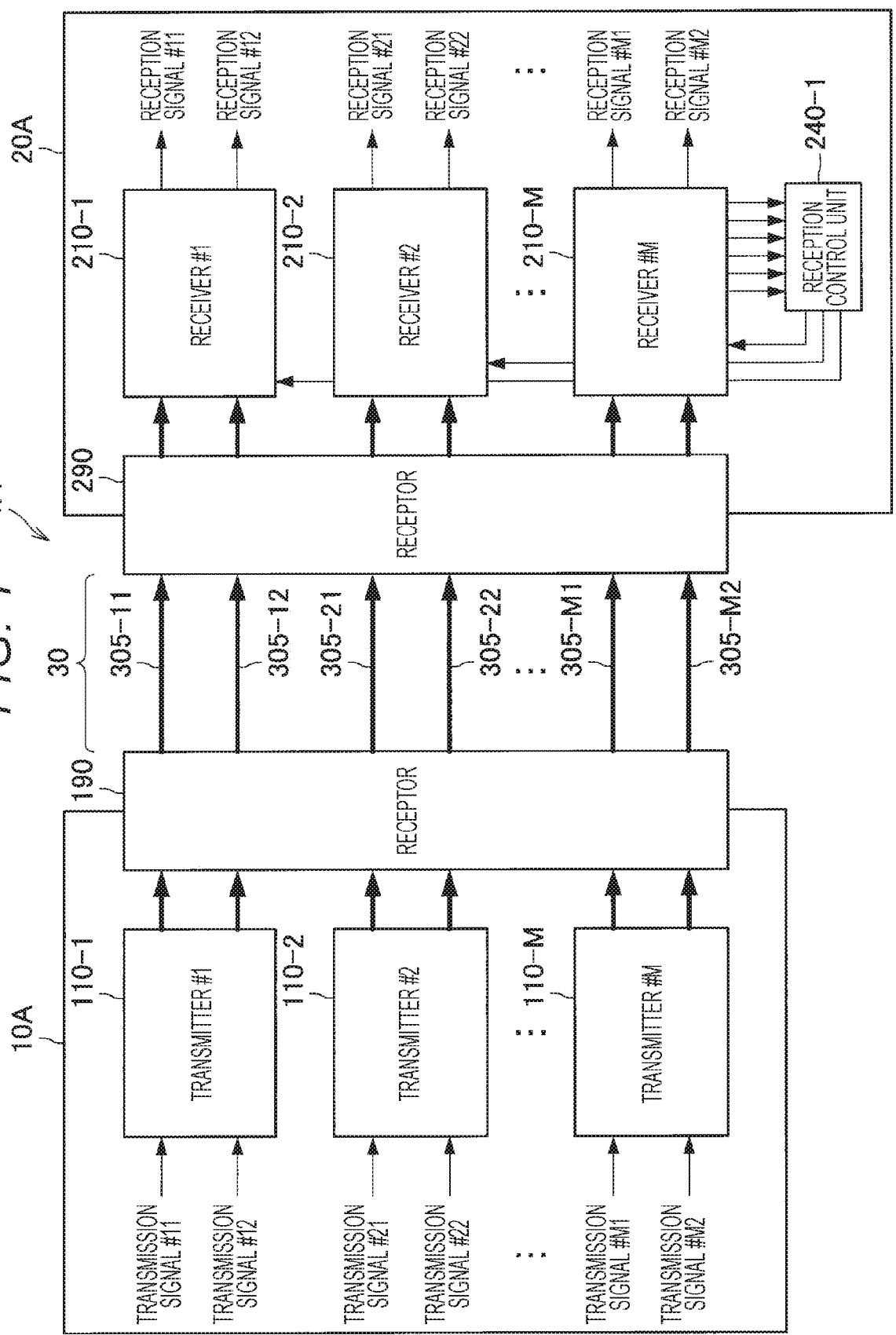
FIG. 1 is a diagram illustrating an example of a configuration of a signal transmission system according to a first embodiment.

Preferred embodiments of the present disclosure will be described in detail below with reference to the accompanying drawings. Note that, in the present specification and the drawings, constituents having substantially the same functional configuration are denoted by the same reference signs, and redundant explanations are omitted.

Furthermore, in the present specification and drawings, a plurality of constituents having substantially the same functional configuration is distinguished by attaching different numerals after the same reference numerals. However, in a case where it is not necessary to distinguish each of the plurality of constituents having substantially the same functional configuration, only the same reference numerals will be given. Furthermore, similar constituents in different embodiments are distinguished by attaching different alphabets after the same reference numerals.

Note that, the description will be made in the following order.
0. Overview
1. First embodiment
1.1 Configuration of signal transmission system
1.2. Configuration of transmission device
1.3. Configuration of reception device
1.4. Description of operation
1.4.1. At time of normal connection
1.4.2. At time of reverse connection
1.5. Description of effect
1.6. Various modifications
2. Second embodiment
2.1. Configuration of signal transmission system
2.2. Description of effect
2.3. Various modifications
3. Third embodiment
3.1. Configuration of signal transmission system
3.2. Configuration of transmission device
3.3. Configuration of reception device
3.4. Description of effect
4. Conclusion 0. Overview First, an outline will be described of the present embodiment. In recent years, high-definition multimedia interface (HDMI), display port (DP), and the like have been known as interfaces for connection between devices. The HDMI, the DP, and the like do not support reverse connection in which the connector is rotated 180 degrees and the front and back of the connector are reversed, and the connector and the receptor cannot be mechanically connected together.

Furthermore, universal serial bus (USB) is also known as an interface for connection between devices. The USBs except for the type-C do not support the reverse connection similarly to the HDMI and the like, but type-C of the USB supports the reverse connection. However, in the type-C, the reverse connection is detected by the CC1 signal and the CC2 signal. In other words, in the type-C, a reverse connection detection lane is added separately from a data transmission lane.

However, to suppress expansion of circuit scale, there is a need for a technology that supports the reverse connection of the connector without adding the reverse connection detection lane. Thus, as an example, a technology has been devised in which polarity inversion of a differential signal is detected and polarity is changed on the basis of a detection result (for example, see Japanese Patent Application Laid-Open No. H6-85796). However, in a case where the technology is applied to connector connection, two signal lines through which differential signals are transmitted need to be arranged in point-symmetric positions with respect to the center of the connector, and wiring restrictions can occur. Furthermore, the technology cannot be applied in a case where a signal that is not a differential signal (for example, an optical signal, or the like) is transmitted.

Furthermore, in peripheral component interconnect (PCI) express, a technology is defined that detects the polarity inversion of a differential signal by using that a D10.2 signal is replaced with a D21.5 signal by polarity inversion in 8b10b signals. However, in a case where the technology is applied to connector connection, wiring restrictions can occur similarly. Furthermore, the technology cannot be applied in a case where a signal that is not a differential signal (for example, an optical signal, or the like) is transmitted. Moreover, the technology cannot be applied to signals other than the 8b10b signals.

Thus, in the present specification, a technology is mainly devised capable of supporting the reverse connection in which the front and back of the connector are reversed while the expansion of the circuit scale is suppressed. More specifically, in the present specification, a technology is mainly devised capable of supporting the reverse connection without requiring addition of the reverse connection detection lane and supporting the reverse connection without using a differential signal. Note that, as described below, for supporting the reverse connection, a mechanism may be included of the reverse connection detection and signal exchange that is performed in a case where the reverse connection is detected.

In the above, the outline has been described of the present embodiment.

1. First Embodiment

Subsequently, a first embodiment will be described.
(1-1. Configuration of Signal Transmission System)

First, a configuration example will be described of a signal transmission system 1A according to the first embodiment. FIG. 1 is a diagram illustrating an example of the configuration of the signal transmission system 1A according to the first embodiment. As illustrated in FIG. 1, the signal transmission system 1A includes a transmission device 10A and a reception device 20A. Furthermore, the transmission device 10A and the reception device 20A are connected to each other via a transmission line 30.

Note that, in the present specification, an example will be mainly described in which a video signal is treated as a transmission signal; however, an audio signal and other types of signals can be treated as transmission signals similarly to the video signal. Furthermore, the transmission signal does not have to be an optical signal, but may be another signal such as an electrical signal. The transmission device 10A can function as a "transmission control device". Furthermore, the reception device 20A can function as a "reception control device". The signal transmission system 1A can function as a "transmission/reception control system".

(1-2. Configuration of Transmission Device)

Subsequently, a configuration will be described of the transmission device 10A. The transmission device 10A is a device that transmits a plurality of transmission signals to a plurality of lanes. Transmission signals #11 to #M2 are (2×M) types of signals, and are input to the transmission device 10A. Each of the transmission signals #11 to #M2 may include a predetermined signal pattern (hereinafter also referred to as a "polarity inversion detection pattern") that enables detection of polarity inversion in a case where polarity is inverted. An example of the polarity reverse pattern will be described in detail later.

As illustrated in FIG. 1, the transmission device 10A includes transmitters 110-1 to 110-M and a receptor 190. The transmitters 110-1 to 110-M transmit the transmission signals #11 to #M2 to lanes 305-11 to 305-M2. Specifically, two types of transmission signals are input to each of the transmitters 110-1 to 110-M. The transmission signal #11 and the transmission signal #12 are input to the transmitter 110-1, the transmission signal #21 and the transmission signal #22 are input to the transmitter 110-2, and the transmission signal #M1 and the transmission signal #M2 are input to the transmitter 110-M.

Then, the transmitters 110-1 to 110-M each transmit two types of transmission signals to corresponding two lanes. Specifically, the transmitter 110-1 is connected to the corresponding lanes 305-11 and 305-12, the transmitter 110-2 is connected to the corresponding lanes 305-21 and 305-22, and the transmitter 110-M is connected to the corresponding lanes 305-M1 and 305-M2.

Figure 2:
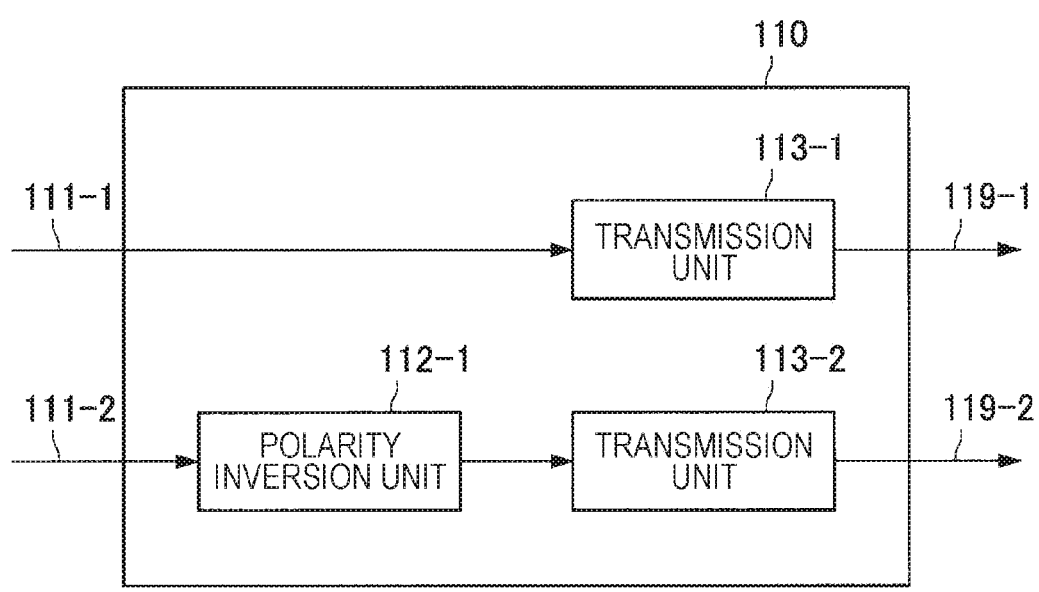
FIG. 2 is a diagram illustrating an example of a detailed configuration of a transmitter according to the first embodiment.

FIG. 2 is a diagram illustrating an example of a detailed configuration of the transmitter 110 according to the first embodiment. As illustrated in FIG. 2, an input port 111-1 and an input port 111-2 are ports to which transmission signals are respectively input. The transmitter 110 includes a polarity inversion unit 112-1, a transmission unit (first transmission unit) 113-1, and a transmission unit (second transmission unit) 113-2. The polarity inversion unit 112-1 inverts and outputs the transmission signal input from the input port 111-2. The transmission unit 113-1 transmits the transmission signal input from the input port 111-1. On the other hand, the transmission unit 113-2 transmits the transmission signal whose polarity is inverted by the polarity inversion unit 112-1.

Specifically, the transmission unit 113-1 includes a laser diode (LD). The LD outputs the transmission signal from an output port 119-1 (for example, an optical output port, or the like). Similarly, the transmission unit 113-2 includes an LD. The LD outputs the transmission signal whose polarity is inverted from an output port 119-2 (for example, an optical output port, or the like). An output signal from the output port 119-1 and an output signal from the output port 119-2 are swapped with each other and input to the reception device 20A at the time of reverse connection.

Note that, in the present embodiment, a case is mainly assumed where the lanes 305-11 to 305-M2 each include an optical fiber, and the LD converts the transmission signal into an optical signal and then transmits the signal to the reception device 20A via the optical fiber. However, a type of the transmission signal is not limited. For example, the transmission device 10A may transmit the transmission signal in an electrical signal to the reception device 20A.

Referring back to FIG. 1, the description will be continued. The transmission line 30 includes the lanes 305-11 to 305-M2 (M is an integer greater than or equal to 2). Here, the number of lanes 305 is illustrated as (2×M), but the number of lanes 305 is not particularly limited as long as the number is plural.

(1-3. Configuration of Reception Device)

Subsequently, a configuration will be described of the reception device 20A. The reception device 20A is a device that receives the plurality of transmission signals as a plurality of reception signals from the plurality of lanes. As illustrated in FIG. 1, the reception device 20A includes receivers 210-1 to 210-M, a reception control unit 240-1, and a receptor 290. The receivers 210-1 to 210-M receive the transmission signals #11 to #M2 as reception signals #11 to #M2 from the lanes 305-11 to 305-M2. Specifically, two types of transmission signals are input to each of the receivers 210-1 to 210-M. Then, the receivers 210-1 to 210-M each output two types of reception signals to corresponding two output destinations.

Figure 3:
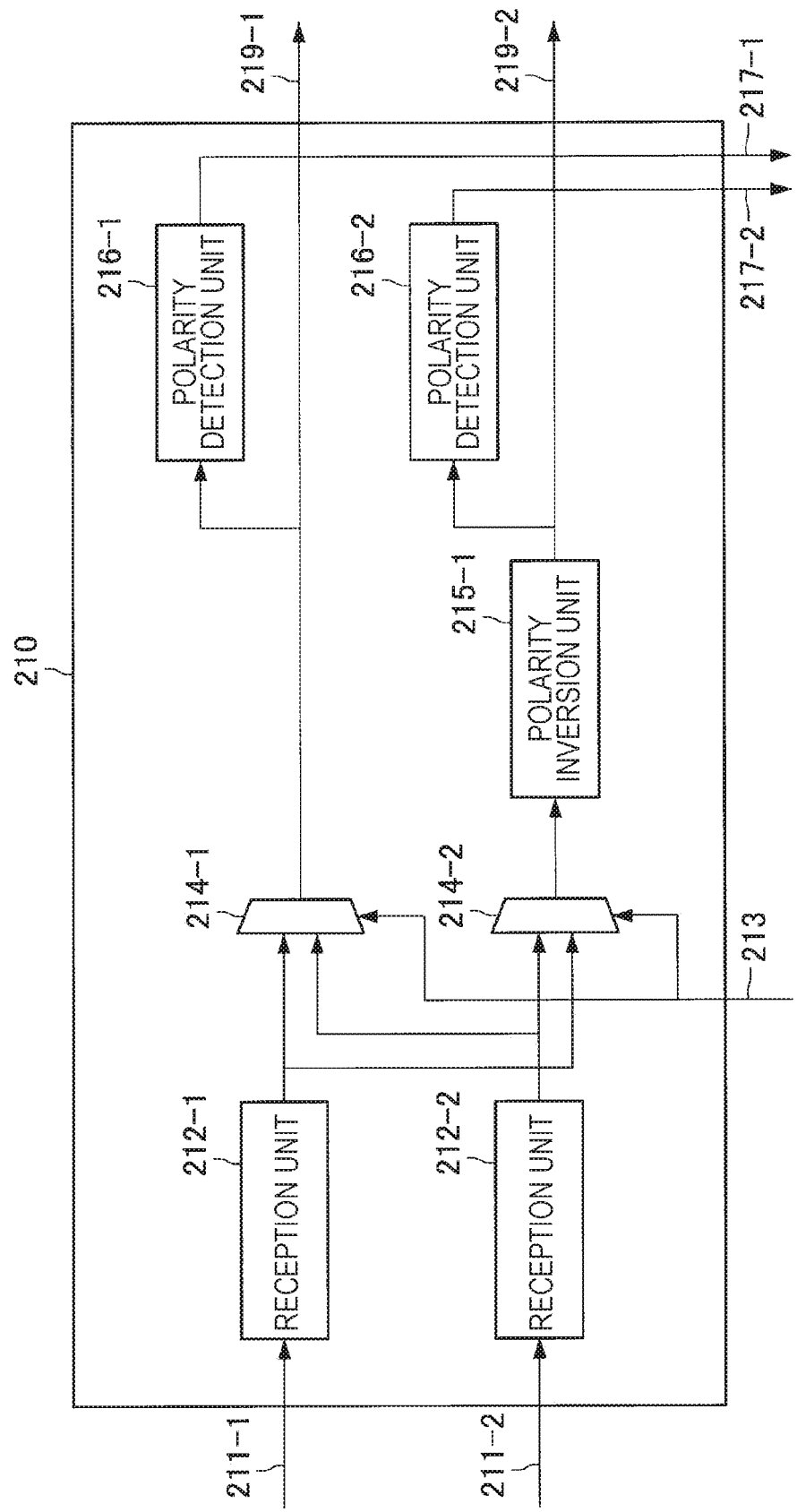
FIG. 3 is a diagram illustrating an example of a detailed configuration of a receiver according to the first embodiment.

FIG. 3 is a diagram illustrating an example of a detailed configuration of the receiver 210 according to the first embodiment. An input port 211-1 and an input port 211-2 are ports to which transmission signals are respectively input. An input signal from the input port 211-1 and an input signal from the input port 211-2 are swapped with each other and input at the time of reverse connection. The receiver 210 includes a reception unit (first reception unit) 212-1, a reception unit (second reception unit) 212-2, a switch 214-1, a switch 214-2, a polarity inversion unit 215-1, a polarity detection unit 216-1, and a polarity detection unit 216-2.

The reception unit 212-1 receives the input signal from the input port 211-1 as a reception signal. Furthermore, the reception unit 212-2 receives the input signal from the input port 211-2 as a reception signal. For example, the reception unit 212-1 includes an analog-to-digital converter and a photodetector (PD). Similarly, the reception unit 212-2 includes an analog-to-digital converter and a PD. The PD receives an input signal input in an optical signal, and converts the optical signal into an electrical signal.

Note that, in the present embodiment, a case is mainly assumed where the lanes 305-11 to 305-M2 each include an optical fiber, and the PD receives an input signal input in an optical signal, and converts the optical signal into an electrical signal. However, as described above, a type is not limited of the signal transmitted from the transmission device 10A to the reception device 20A. For example, the reception device 20A may receive the transmission signal in an electrical signal from the transmission device 10A.

The switch 214-1 and the switch 214-2 are signal selection switches, and output, to the subsequent stage, the reception signal from the reception unit 212-1 and the reception signal from the reception unit 212-2 without performing exchange (no exchange) or after performing exchange of the signals, in accordance with an exchange control signal 213. The reception signal is output from the switch 214-1 to the polarity detection unit 216-1 and an output port (first output port) 219-1. On the other hand, the reception signal is output from the switch 214-2 to the polarity inversion unit 215-1 and an output port (second output port) 219-2.

The polarity inversion unit 215-1 performs polarity inversion on the reception signal output from the switch 214-2. The reception signal whose polarity is inverted is output to the polarity detection unit 216-2 and the output port 219-2.

The polarity detection unit 216-1 determines presence or absence of polarity inversion (detects polarity) of the reception signal output from the switch 214-1. More specifically, in a case where the polarity inversion detection pattern is included in the reception signal output from the switch 214-1, the polarity detection unit 216-1 may detect the presence or absence of polarity inversion by the polarity inversion detection pattern. The polarity detection unit 216-1 outputs the presence or absence of polarity inversion as a polarity determination result signal 217-1.

Referring back to FIG. 1, the description will be continued. Polarity determination result signals respectively output from the receivers 210-1 to 210-M are input to the reception control unit 240-1. The reception control unit 240-1 outputs, to the receiver 210-1, an exchange control signal corresponding to a polarity determination result signal output from the receiver 210-1. Similarly, the reception control unit 240-1 outputs, to the receiver 210-2, an exchange control signal corresponding to a polarity determination result signal output from the receiver 210-2. Furthermore, the reception control unit 240-1 outputs, to the receiver 210-M, an exchange control signal corresponding to a polarity determination result signal output from the receiver 210-M.

Furthermore, (2*M) types of reception signals are output from the receivers 210-1 to 210-M. Specifically, the reception signal #11 and the reception signal #12 are output from the receiver 210-1. Similarly, the reception signal #21 and the reception signal #22 are output from the receiver 210-1. Furthermore, the reception signal #M1 and the reception signal #M2 are output from the receiver 210-1.

Figure 4:
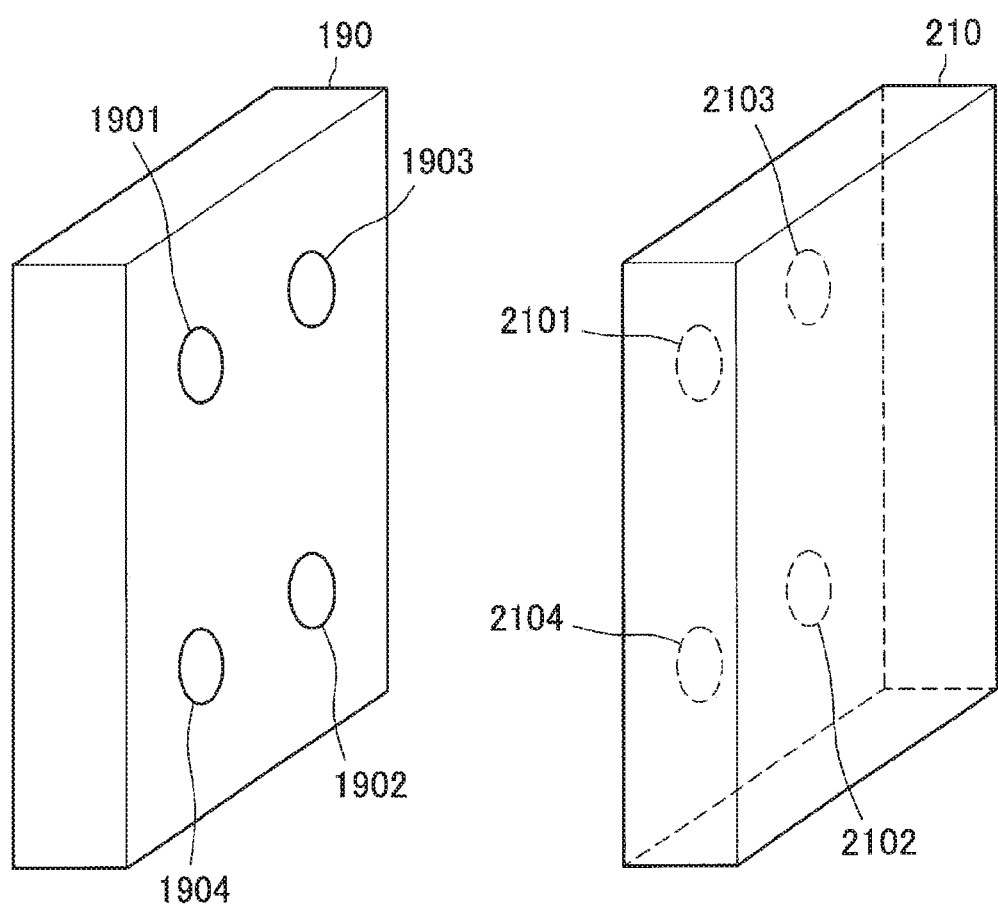
FIG. 4 is a diagram illustrating a signal arrangement example in each of two receptors in the case of M=2.

Subsequently, a signal arrangement example will be described in each of the receptor 190 and the receptor 290. Here, a case is assumed where the number of transmitters 110 is two (M=2). FIG. 4 is a diagram illustrating a signal arrangement example in each of the receptor 190 and the receptor 290 in the case of M=2. As illustrated in FIG. 4, the receptor 190 is included in the transmission device 10A, and the receptor 290 is included in the reception device 20A.

Here, at a connection portion 1901 and a connection portion 1902 existing at positions point-symmetric to each other with respect to the center of the receptor 190, a transmission signal pair (the transmission signal #11 and the transmission signal #12) is arranged that is output from the first transmitter 110-1. Furthermore, at a connection portion 1903 and a connection portion 1904 existing at positions point-symmetric to each other with respect to the center of the receptor 190, a transmission signal pair (the transmission signal #21 and the transmission signal #22) is arranged that is output from the second transmitter 110-2.

At the time of normal connection, the connection portion 1901 and a connection portion 2101 are connected to each other by the lane 305-11, and the connection portion 1902 and the connection portion 2102 are connected to each other by the lane 305-12. At this time, the transmission unit 113-1 in the transmitter 110-1 and the reception unit 212-1 in the receiver 210-1 are connected to each other, and the transmission unit 113-2 in the transmitter 110-1 and the reception unit 212-2 in the receiver 210-1 are connected to each other.

On the other hand, at the time of reverse connection, the connection portion 1901 and the connection portion 2102 are connected to each other by the lane 305-11, and the connection portion 1902 and the connection portion 2101 are connected to each other by the lane 305-12. At this time, the transmission unit 113-1 in the transmitter 110-1 and the reception unit 212-2 in the receiver 210-1 are connected to each other, and the transmission unit 113-2 in the transmitter 110-1 and the reception unit 212-1 in the receiver 210-1 are connected to each other.

In other words, between the normal connection and the reverse connection, the transmission signal pair (the transmission signal #11 and the transmission signal #12) is reversed that is output from the transmitter 110-1.

Similarly, at the time of normal connection, the connection portion 1903 and the connection portion 2103 are connected to each other by the lane 305-21, and the connection portion 1904 and the connection portion 2104 are connected to each other by the lane 305-22. At this time, the transmission unit 113-1 in the transmitter 110-2 and the reception unit 212-1 in the receiver 210-2 are connected to each other, and the transmission unit 113-2 in the transmitter 110-2 and the reception unit 212-2 in the receiver 210-2 are connected to each other.

On the other hand, at the time of reverse connection, the connection portion 1903 and the connection portion 2104 are connected to each other by the lane 305-21, and the connection portion 1904 and the connection portion 2103 are connected to each other by the lane 305-22. At this time, the transmission unit 113-1 in the transmitter 110-2 and the reception unit 212-1 in the receiver 210-2 are connected to each other, and the transmission unit 113-2 in the transmitter 110-2 and the reception unit 212-2 in the receiver 210-2 are connected to each other.

In other words, between the normal connection and the reverse connection, the transmission signal pair (the transmission signal #21 and the transmission signal #22) is reversed that is output from the transmitter 110-2.

(1-4. Description of Operation)

Subsequently, with reference to FIGS. 1 to 4, an example will be described of operation of the signal transmission system 1A according to the first embodiment of the present disclosure. Specifically, an example will be described of operation of reverse connection detection and signal exchange. First, an example will be described of operation at the time of normal connection, and then an example will be described of operation at the time of reverse connection.

(1-4-1. At Time of Normal Connection)

The example will be described of the operation at the time of normal connection. The input signal input from the input port 111-1 in each of the transmitters 110-1 to 110-M is output from the output port 119-1 without polarity inversion, and since it is the time of normal connection, the signal is input to the input port 211-1 in each of the receivers 210-1 to 110-M (the input signal is received as a first reception signal by the reception unit 212-1). Since the exchange control signal 213 indicates no exchange as an initial value, the input signal input from the input port 211-1 is output from the switch 214-1 to the polarity detection unit 216-1 and the output port 219-1. The polarity detection unit 216-1 outputs, as the polarity determination result signal 217-1, a determination result indicating that there is no polarity inversion on the basis of the input signal.

On the other hand, the input signal input from the input port 111-2 in each of the transmitters 110-1 to 110-M is inverted in polarity by the polarity inversion unit 215-1 and output from the output port 119-2, and since it is the time of normal connection, the signal is input to the input port 211-2 in the receiver 210 (the input signal is received as a second reception signal by the reception unit 212-2). Since the exchange control signal 213 indicates no exchange as the initial value, the input signal input from the input port 211-2 is output from the switch 214-2 to the polarity inversion unit 215-1.

In the polarity inversion unit 215-1, since the polarity inversion is performed again subsequently to the polarity inversion in the polarity inversion unit 112-1, a signal without polarity inversion to the input signal input to the input port 111-2 is output from the polarity inversion unit 215-1 to the polarity detection unit 216-2 and the output port 219-1. In the polarity detection unit 216-2, a determination result indicating that there is no polarity inversion is output as a polarity determination result signal 217-2.

Since the polarity determination result signal 217-1 and the polarity determination result signal 217-2 each indicating that there is no polarity inversion are input to the reception control unit 240-1, the reception control unit 240-1 outputs, to the receivers 210-1 to 210-M, the exchange control signal 213 indicating no exchange. Subsequently, the input signal input from the input port 111-1 in each of the transmitters 110-1 to 110-M is input to the input port 211-1 of each of the receivers 210-1 to 210-M (the input signal is received as a third reception signal by the reception unit 212-1). Then, since the exchange control signal 213 indicates no exchange, the input signal is output from the switch 214-1 to the output port 219-1.

On the other hand, the input signal input from the input port 111-2 in each of the transmitters 110-1 to 110-M is inverted in polarity by the polarity inversion unit 112-1, and since it is the time of normal connection, the signal is input to the input port 211-2 of each of the receivers 210-1 to 210-M (the input signal is received as a fourth reception signal by the reception unit 212-2). Then, since the exchange control signal 213 indicates no exchange, the input signal whose polarity is inverted is output from the switch 214-2 to the polarity inversion unit 215-1. In the polarity inversion unit 215-1, since the polarity inversion is performed again subsequently to the polarity inversion in the polarity inversion unit 112-1, a signal without polarity inversion to the input signal input to the input port 111-2 is output from the polarity inversion unit 215-1 to the polarity detection unit 216-2 and the output port 219-1.

As a result of such control, the transmission signal input from the input port 111-1 in each of the transmitters 110-1 to 110-M is output, as the reception signal, from the output port 219-1 in each of the receivers 210-1 to 210-M. On the other hand, the transmission signal input from the input port 111-2 in each of the transmitters 110-1 to 110-M is output, as the reception signal, from the output port 219-2 in each of the receivers 210-1 to 210-M.

(1-4-2. At Time of Reverse Connection)

Subsequently, the example will be described of the operation at the time of reverse connection. The input signal input from the input port 111-1 in each of the transmitters 110-1 to 110-M is output from the output port 119-1 without polarity inversion, and since it is the time of reverse connection, the signal is input to the input port 211-2 in each of the receivers 210-1 to 110-M (the input signal is received as the fourth reception signal by the reception unit 212-2). Since the exchange control signal 213 indicates no exchange as the initial value, the input signal input from the input port 211-2 is output from the switch 214-2 to the polarity inversion unit 215-1.

Since polarity inversion is performed in the polarity inversion unit 215-1, a signal whose polarity is inverted to the input signal input to the input port 111-1 is output from the polarity inversion unit 215-1 to the polarity detection unit 216-2 and the output port 219-2. In the polarity detection unit 216-2, a determination result indicating that there is polarity inversion is output as the polarity determination result signal 217-2.

On the other hand, the input signal input from the input port 111-2 in each of the transmitters 110-1 to 110-M is inverted in polarity by the polarity inversion unit 215-1 and output from the output port 119-2, and since it is the time of reverse connection, the signal is input to the input port 211-1 in the receiver 210 (the input signal is received as the third reception signal by the reception unit 212-1). Since the exchange control signal 213 indicates no exchange as an initial value, the input signal input from the input port 211-1 is output from the switch 214-1 to the polarity detection unit 216-1 and the output port 219-1.

The polarity detection unit 216-1 outputs, as the polarity determination result signal 217-1, a determination result indicating that there is polarity inversion on the basis of the input signal.

Since the polarity determination result signal 217-1 and the polarity determination result signal 217-2 each indicating that there is polarity inversion are input to the reception control unit 240-1, the reception control unit 240-1 outputs, to the receivers 210-1 to 210-M, the exchange control signal 213 indicating exchange. Subsequently, since it is the time of reverse connection, the input signal input from the input port 111-1 in each of the transmitters 110-1 to 110-M is input to the input port 211-2 of each of the receivers 210-1 to 210-M (the input signal is received as the fourth reception signal by the reception unit 212-2). Then, since the exchange control signal 213 indicates exchange, the input signal is output from the switch 214-1 to the output port 219-1.

On the other hand, the input signal input from the input port 111-2 in each of the transmitters 110-1 to 110-M is inverted in polarity by the polarity inversion unit 112-1, and since it is the time of reverse connection, the signal is input to the input port 211-1 of each of the receivers 210-1 to 210-M (the input signal is received as the third reception signal by the reception unit 212-1). Then, since the exchange control signal 213 indicates exchange, the input signal whose polarity is inverted is output from the switch 214-2 to the polarity inversion unit 215-1. In the polarity inversion unit 215-1, since the polarity inversion is performed again subsequently to the polarity inversion in the polarity inversion unit 112-1, a signal without polarity inversion to the input signal input to the input port 111-2 is output from the polarity inversion unit 215-1 to the polarity detection unit 216-2 and the output port 219-1.

As a result of such control, the transmission signal input from the input port 111-1 in each of the transmitters 110-1 to 110-M is output, as the reception signal, from the output port 219-1 in each of the receivers 210-1 to 210-M. On the other hand, the transmission signal input from the input port 111-2 in each of the transmitters 110-1 to 110-M is output, as the reception signal, from the output port 219-2 in each of the receivers 210-1 to 210-M.

(1-5. Description of Effect)

As described above, according to the first embodiment of the present disclosure, between the time of normal connection and the time of reverse connection, a correspondence relationship is not changed between input positions of the transmission signals to the transmitters 110-1 to 110-M and output positions of the reception signals from the respective receivers 210-1 to 210-M. Therefore, according to the first embodiment of the present disclosure, it becomes possible to support the reverse connection in which the front and back of the connector are reversed while the expansion of the circuit scale is suppressed. More specifically, according to the first embodiment of the present disclosure, it becomes possible to support the reverse connection without requiring addition of the reverse connection detection lane, and to support the reverse connection without using the differential signal.

(1-6. Various modifications)

In the above, an example has been mainly described in which in a case where the polarity determination result signal 217-1 and the polarity determination result signal 217-2 indicate the same determination result, the reception control unit 240-1 outputs, to the receivers 210-1 to 210-M, the exchange control signal 213 corresponding to the determination result. However, the reception control unit 240-1 may output, to the receivers 210-1 to 210-M, the exchange control signal 213 corresponding to one of the polarity determination result signal 217-1 or the polarity determination result signal 217-2.

Furthermore, in the above, an example has been mainly described in which the reception device 20A includes both the polarity detection unit 216-1 and the polarity detection unit 216-2. However, the reception device 20A may include only one of the polarity detection unit 216-1 or the polarity detection unit 216-2. At this time, one of the polarity detection unit 216-1 or the polarity detection unit 216-2 outputs a polarity determination result signal to the reception control unit 240-1. Furthermore, the polarity inversion detection pattern may be included only in the transmission signal whose polarity is to be detected.

Furthermore, in the above, an example has been mainly described in which in a case where the polarity determination result signals 217 input from the respective receivers 210-1 to 210-M indicate the same determination result, the reception control unit 240-1 outputs, to the receivers 210-1 to 210-M, the exchange control signal 213 corresponding to the determination result. However, the reception control unit 240-1 may output, to the receivers 210-1 to 210-M, the exchange control signal 213 corresponding to at least one of the polarity determination result signals input from the respective receivers 210-1 to 210-M.

Furthermore, examples of the polarity inversion detection pattern are not particularly limited. As an example, the polarity inversion detection pattern may include a predetermined signal whose corresponding code changes before and after polarity inversion. At this time, the polarity detection unit 216 only needs to detect the polarity on the basis of whether or not the code corresponding to the predetermined signal has changed. Here, a case will be described where 8b10b is used as a coding method as the polarity inversion detection pattern.

FIG. 5 is a diagram for explaining an example of the polarity inversion detection pattern in a case where 8b10b is used as the coding method. Referring to FIG. 5, a signal before polarity inversion is illustrated as "original signal" and a signal after polarity inversion is illustrated as "polarity inversion signal". As illustrated in FIG. 5, K28.5 as an example of the code is also K28.5 after polarity inversion. On the other hand, D10.2 as an example of the code changes to D21.5 after polarity inversion. Therefore, it is possible to detect the polarity depending on whether or not the code has changed.

Note that, K28.5 and D10.2 are included in TPS2 and TPS3, which are test patterns at the time of Link Training of Display Port. On the other hand, D21.5 is not included in TPS2 or TPS3. Therefore, it is sufficient that the polarity is detected depending on whether or not D21.5 has occurred, so that the signal transmission system 1A according to the present embodiment can be applied to the case of being based on Display Port.

Furthermore, as another example, the polarity inversion detection pattern may include a predetermined pulse signal pattern. At this time, the polarity detection unit 216 only needs to detect the polarity on the basis of whether or not the pulse signal pattern is inverted in polarity. In the following, some patterns will be described as examples of the pulse signal pattern.

Figure 6:
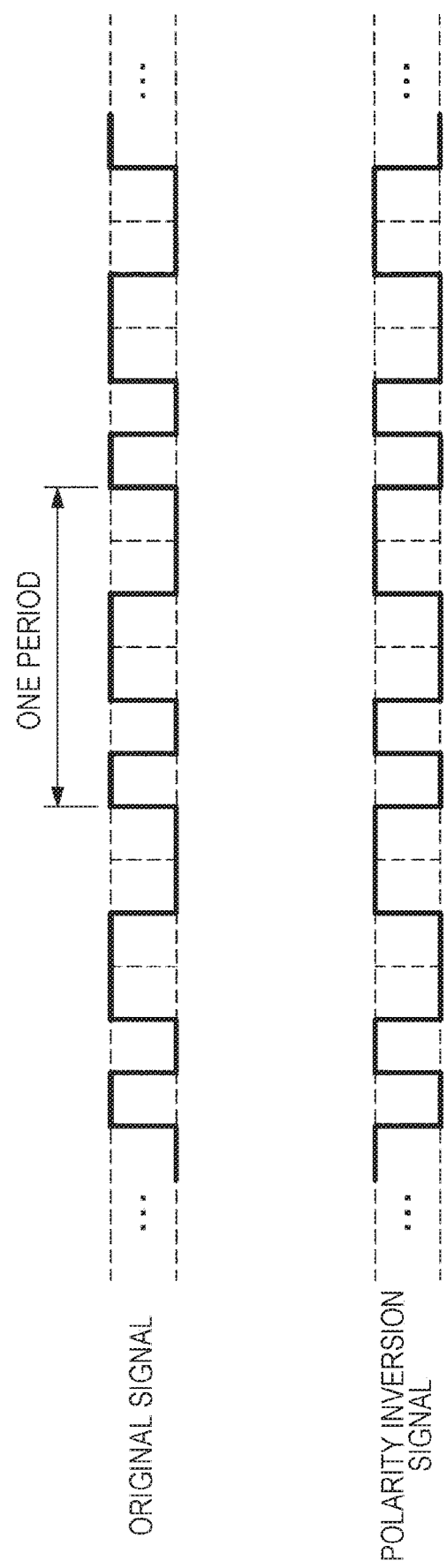
FIG. 6 is a diagram illustrating a first example of a pulse signal pattern.

FIG. 6 is a diagram illustrating a first example of the pulse signal pattern. Referring to FIG. 6, a signal before polarity inversion is illustrated as "original signal" and a signal after polarity inversion is illustrated as "polarity inversion signal". Furthermore, in the "original signal", a pulse signal pattern (one period) is repeated. At this time, if the pulse signal pattern (one period) is included in a signal obtained by connecting together and inverting a plurality of predetermined pulse signal patterns (one period), the pulse signal pattern (one period) can be detected from both of the "original signal" and the "polarity inversion signal", so that the polarity is not detected.

Thus, it is preferable that the pulse signal pattern (one period) is not included in the signal obtained by connecting together and inverting the plurality of predetermined pulse signal patterns (one period). In the example illustrated in FIG. 6, since the pulse signal pattern (one period) is not included in the signal obtained by connecting together and inverting the plurality of predetermined pulse signal patterns (one period), the polarity can be detected depending on that the pulse signal pattern (one period) is at the high level (for example, depending on whether the pulse signal pattern starts from the high level or the low level). Note that, in the example illustrated in FIG. 6, the duty ratio of the "original signal" is 50%.

Figure 7:
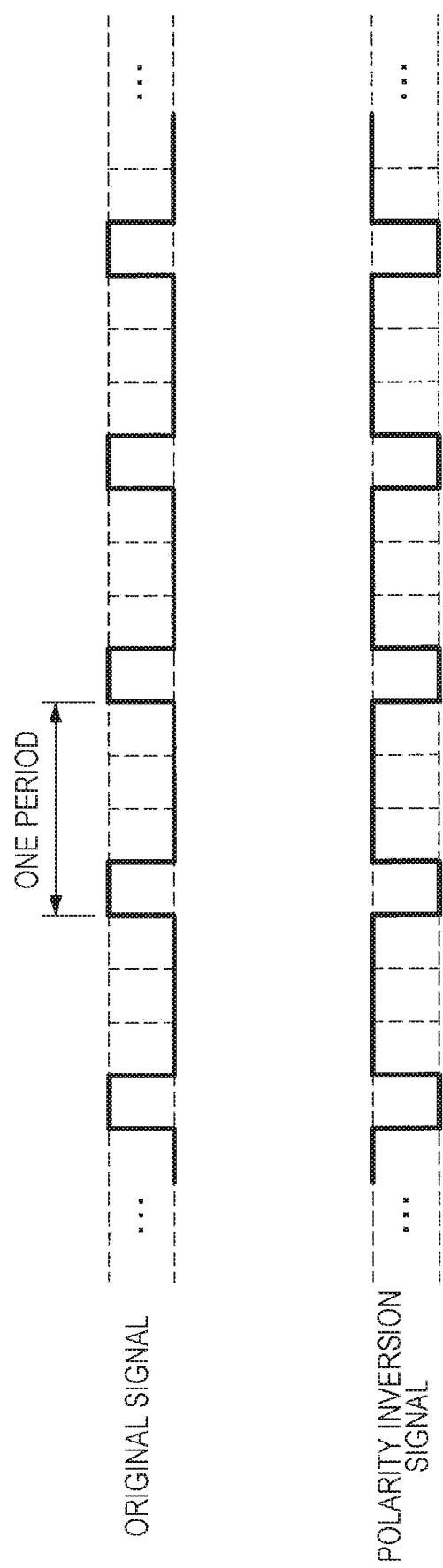
FIG. 7 is a diagram illustrating a second example of the pulse signal pattern.

FIG. 7 is a diagram illustrating a second example of the pulse signal pattern. Referring to FIG. 7, a signal before polarity inversion is illustrated as "original signal" and a signal after polarity inversion is illustrated as "polarity inversion signal". In the "original signal", a pulse signal pattern (one period) is repeated. Also in the example illustrated in FIG. 7, since the pulse signal pattern (one period) is not included in the signal obtained by connecting together and inverting the plurality of predetermined pulse signal patterns (one period), the polarity can be detected by the pattern (one period). Note that, in the example illustrated in FIG. 7, the duty ratio of the "original signal" is 25%/75%.

Figure 8:
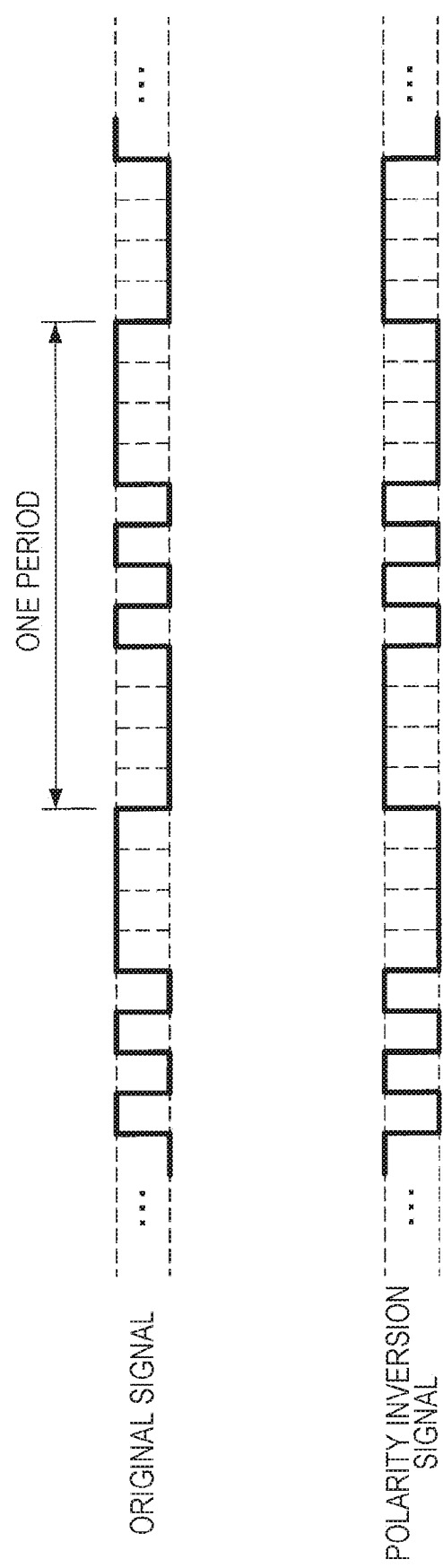
FIG. 8 is a diagram illustrating a third example of the pulse signal pattern.

FIG. 8 is a diagram illustrating a third example of the pulse signal pattern. Referring to FIG. 8, a signal before polarity inversion is illustrated as "original signal" and a signal after polarity inversion is illustrated as "polarity inversion signal". In the "original signal", a pulse signal pattern (one period) is repeated. Also in the example illustrated in FIG. 8, the pulse signal pattern (one period) is not included in the signal obtained by connecting together and inverting the plurality of predetermined pulse signal patterns (one period), the polarity can be detected by the pattern (one period). Note that, in the example illustrated in FIG. 8, the duty ratio of the "original signal" is 50%, similarly to the example illustrated in FIG. 6.

2. Second Embodiment

Subsequently, a second embodiment will be described.

(2-1. Configuration of Signal Transmission System)

Figure 9:
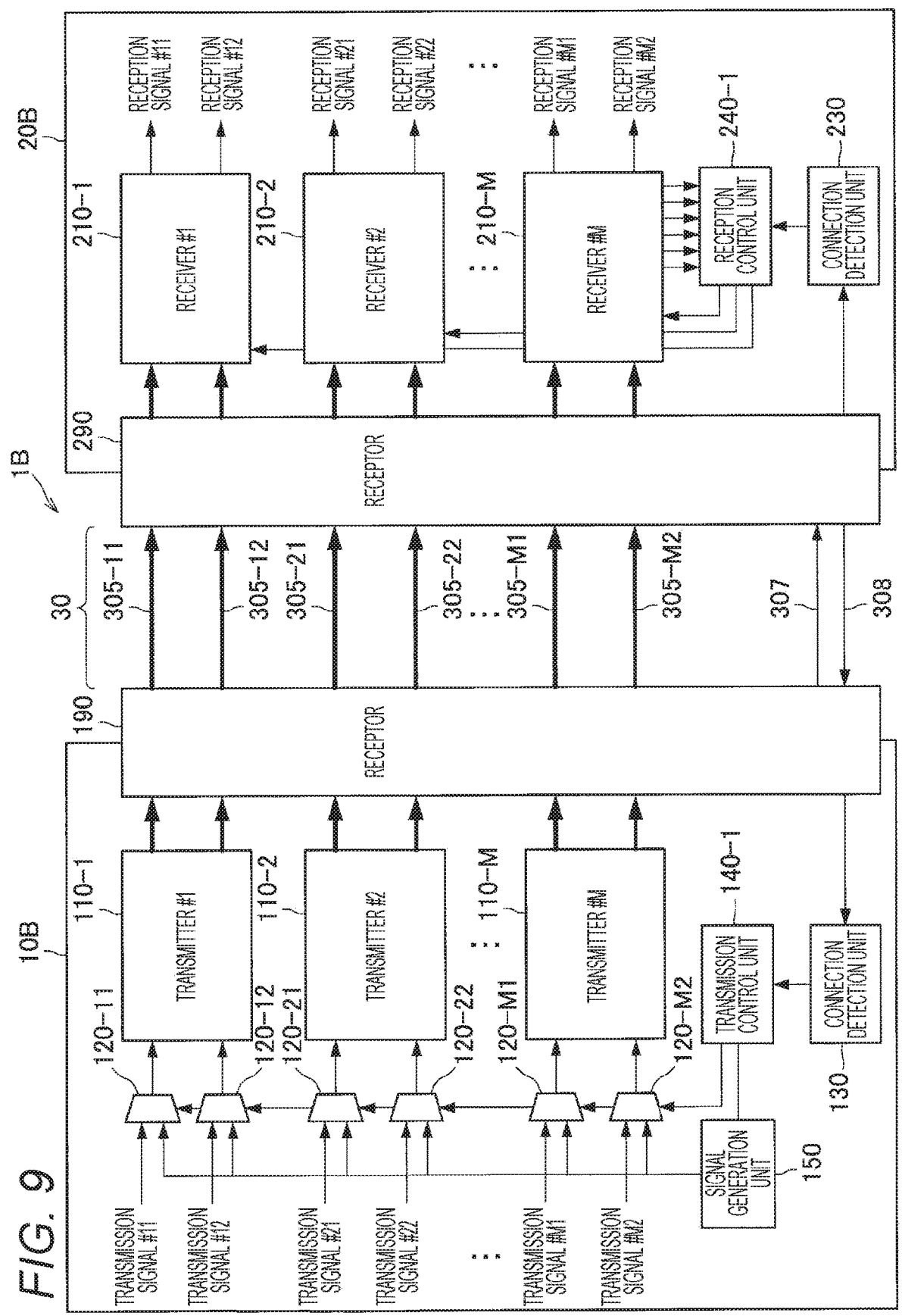
FIG. 9 is a diagram illustrating an example of a configuration of a signal transmission system according to a second embodiment.

A configuration example will be described of a signal transmission system 1B according to the second embodiment. Unlike the first embodiment, in the second embodiment, a connection detection mechanism is included, and polarity detection is performed only at the time of connection detection detected by the connection detection mechanism. FIG. 9 is a diagram illustrating an example of the configuration of the signal transmission system 1B according to the second embodiment. As illustrated in FIG. 9, the signal transmission system 1B includes a transmission device 10B and a reception device 20B.

Furthermore, the transmission device 10B according to the second embodiment is mainly different from the transmission device 10A according to the first embodiment in that the transmission device 10B includes a connection detection unit 130, a signal generation unit 150, and transmission signal selection switches 120-11 to 120-M2. On the other hand, the reception device 20B according to the second embodiment is mainly different from the reception device 20A according to the first embodiment in that the reception device 20B includes a connection detection unit 230. In the second embodiment, a configuration will be mainly described different from that of the first embodiment.

In the transmission device 10B, the connection detection unit 130 detects connection (normal connection or reverse connection). As an example, the connection detection unit 130 detects the connection by receiving a connection detection signal 308 from the reception device 20B at the time of connection. When detecting the connection, the connection detection unit 130 outputs, to a transmission control unit 140-1, a connection detection result signal indicating that the connection is detected.

When detecting the connection detection result signal, the transmission control unit 140-1 outputs a polarity inversion detection pattern output start instruction signal to the signal generation unit 150, and also outputs, to each of the transmission signal selection switches 120-11 to 120-M2, an input control signal for switching input sources from the transmission signals #11 to #M2 to the signal generation unit 150. The signal generation unit 150 starts outputting the polarity inversion detection pattern in accordance with the polarity inversion detection pattern output start instruction signal, and the transmission signal selection switches 120-11 to 120-M2 switch the input sources to the signal generation unit 150 in accordance with the input control signal.

In the reception device 20B, the connection detection unit 230 detects connection (normal connection or reverse connection). As an example, the connection detection unit 230 detects the connection by receiving a connection detection signal 307 from the transmission device 10B at the time of connection. When detecting the connection, the connection detection unit 230 outputs, to the reception control unit 240, a connection detection result signal indicating that the connection is detected.

When detecting the connection detection result signal, the reception control unit 240 outputs, to each of the receivers 210-1 to 210-M, an exchange control signal corresponding to the polarity determination result signal input from each of the receivers 210-1 to 210-M. The switch 214-1 outputs, to the subsequent stage, the reception signal from the reception unit 212-1 and the reception signal from the reception unit 212-2 without performing exchange (no exchange) or performing exchange of the signals, in accordance with the exchange control signal. The switch 214-2 outputs, to the subsequent stage, the reception signal from the reception unit 212-1 and the reception signal from the reception unit 212-2 without performing exchange (no exchange) or performing exchange of the signals, in accordance with the exchange control signal.

In the transmission device 10B, the transmission control unit 140-1 outputs a polarity inversion detection pattern output stop instruction signal to the signal generation unit 150 after a predetermined time has elapsed from the start of outputting the polarity inversion detection pattern, and also outputs, to each of the transmission signal selection switches 120-11 to 120-M2, an input control signal for switching the input sources from the signal generation unit 150 to the transmission signals #11 to #M2. The signal generation unit 150 stops outputting the polarity inversion detection pattern in accordance with the polarity inversion detection pattern output stop instruction signal, and the transmission signal selection switches 120-11 to 120-M2 switch the input sources to the respective signal selection switches 120-11 to 120-M2 in accordance with the input control signal.

In the reception device 20B, the reception control unit 240-1 may perform control so that polarity detection is not performed by each of the polarity detection unit 216-1 and the polarity detection unit 216-2 until the next connection is detected after a predetermined time has elapsed since the polarity detection is performed by each of the polarity detection unit 216-1 and the polarity detection unit 216-2. Furthermore, the reception control unit 240-1 does not have to output the exchange control signal to each of the switch 214-1 and the switch 214-2 until the next connection is detected after a predetermined time has elapsed from output of the exchange control signal to each of the switch 214-1 and the switch 214-2.

(2-2. Description of Effect)

As described above, according to the second embodiment of the present disclosure, the polarity inversion detection pattern is transmitted only in a case where the connection is detected. Therefore, according to the second embodiment of the present disclosure, it becomes possible to reduce the amount of data transmitted through the lanes 305-11 to 305-M2. Furthermore, according to the second embodiment of the present disclosure, it becomes possible to perform polarity detection and exchange control only in a case where the connection is detected.

(2-3. Various Modifications)

In the above, an example has been mainly described in which the connection detection unit 230 detects the connection by receiving the connection detection signal 307 from the transmission device 10B at the time of connection. However, the connection detection unit 230 may detect the connection on the basis of a reception state of all or part of the receivers 210-1 to 210-M. For example, the connection detection unit 230 may detect whether or not the connection is made, depending on whether or not reception is normally performed from the transmission device 10B by any of the receivers 210-1 to 210-M.

Furthermore, in the above, an example has been mainly described in which the transmission control unit 140-1 outputs the polarity inversion detection pattern output stop instruction signal after the predetermined time has elapsed from the start of outputting the polarity inversion detection pattern, and also outputs the input control signal for switching the input sources to the transmission signals #11 to #M2. However, in a case where the polarity detection is completed, the reception device 20B may transmit a polarity detection completion notification to the transmission device 10B. At this time, in a case where the polarity detection completion notification is received, the transmission device 10B may output the polarity inversion detection pattern output stop instruction signal, and also output the input control signal for switching the input sources to the transmission signals #11 to #M2.

Furthermore, in a case where the connection is detected in each of the transmission device 10B and the reception device 20B, it becomes possible to match transmission/reception timings of the polarity inversion detection pattern, with a timing at which the connection is detected as a reference, between the transmission device 10B and the reception device 20B. For example, a fixed signal after the connection is detected may be included in the polarity inversion detection pattern. At this time, each of the polarity detection unit 216-1 and the polarity detection unit 216-2 only needs to detect the polarity on the basis of whether or not the fixed signal is inverted in polarity.

Figure 10:
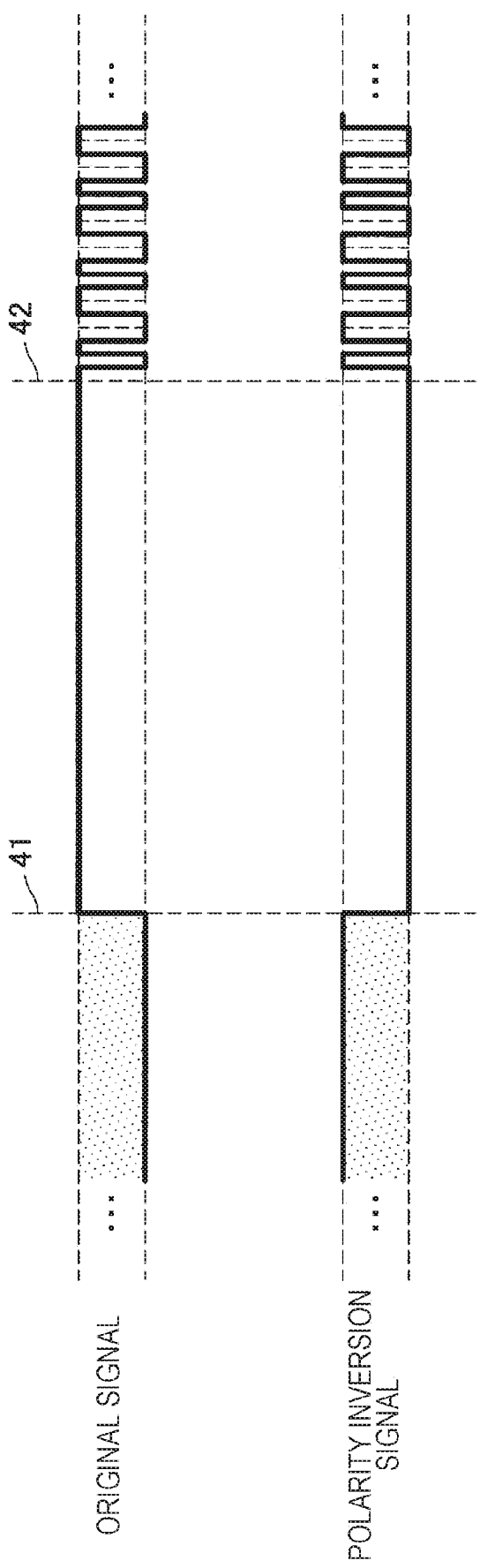
FIG. 10 is a diagram illustrating an example of the configuration of the signal transmission system according to the second embodiment.

FIG. 10 is a diagram illustrating an example of the fixed signal transmitted after the connection is detected. Referring to FIG. 10, after a connection detection timing 41 and before a polarity detection timing 42, the fixed signal is transmitted as an example of the polarity inversion detection pattern. In FIG. 10, the fixed signal is illustrated by a signal fixed at the high level. At this time, the polarity inversion signal of the fixed signal is a signal fixed at the low level. After the polarity detection timing 42, a transmission target is switched from the polarity inversion detection pattern to the transmission signals #11 to #M2.

3. Third Embodiment

Subsequently, a third embodiment will be described.

(3-1. Configuration of Signal Transmission System)

Figure 11:
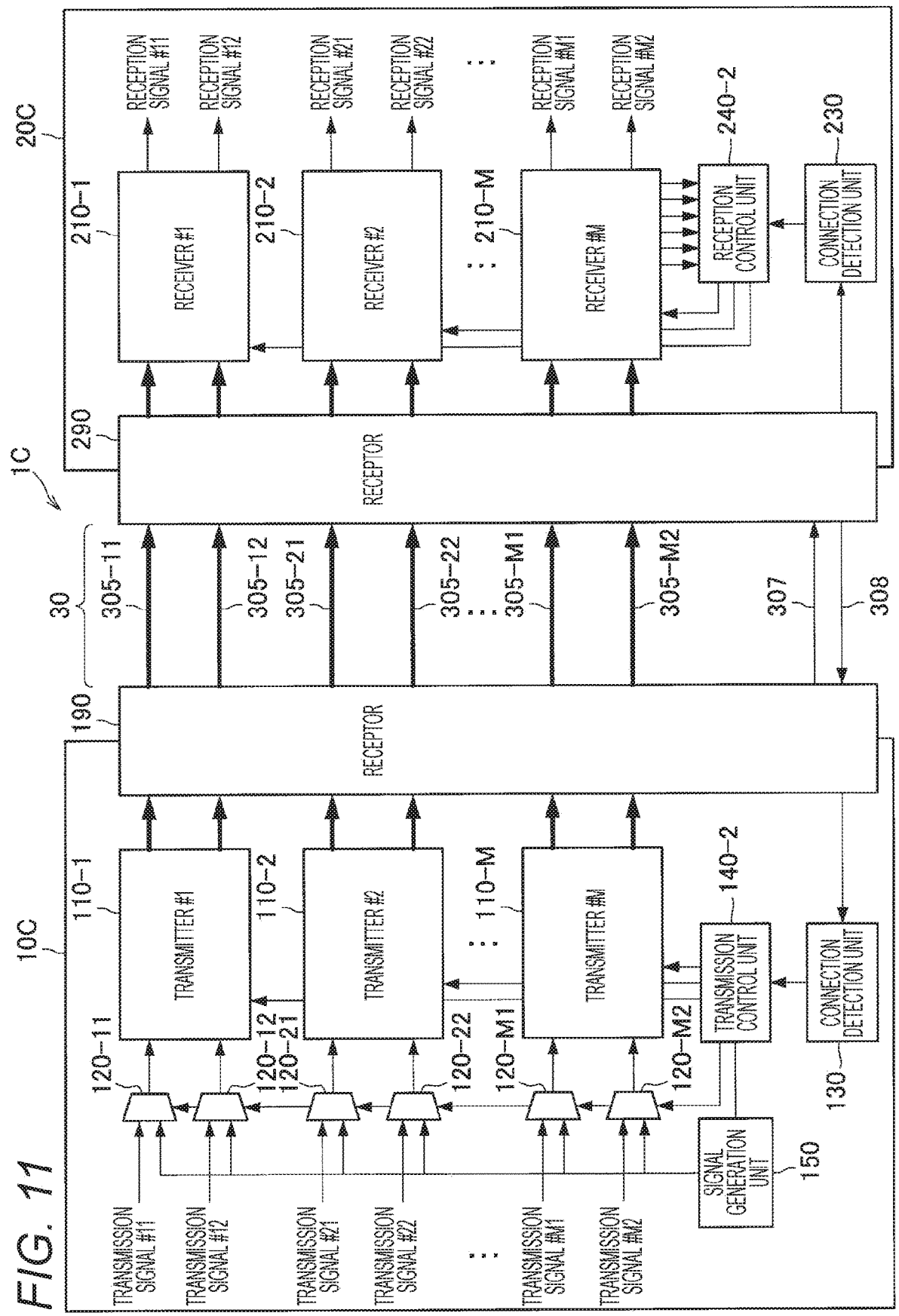
FIG. 11 is a diagram illustrating an example of a configuration of a signal transmission system according to a third embodiment.

A configuration example will be described of a signal transmission system 1C according to the third embodiment. Unlike the second embodiment, in the third embodiment, polarity inversion is performed only in a case where polarity detection is performed after connection detection is performed. FIG. 11 is a diagram illustrating an example of the configuration of the signal transmission system 1C according to the third embodiment. As illustrated in FIG. 11, the signal transmission system 1C includes a transmission device 10C and a reception device 20C.

Furthermore, the transmission device 10C according to the third embodiment is mainly different from the transmission device 10B according to the second embodiment in that the transmission device 10C includes a transmission control unit 140-2 instead of the transmission control unit 140-1. On the other hand, the reception device 20B according to the third embodiment is mainly different from the reception device 20B according to the second embodiment in that the reception device 20B includes a reception control unit 240-2 instead of the reception control unit 240-1. In the third embodiment, a configuration will be mainly described different from that of the second embodiment.

(3-2. Configuration of Transmission Device)

Figure 12:
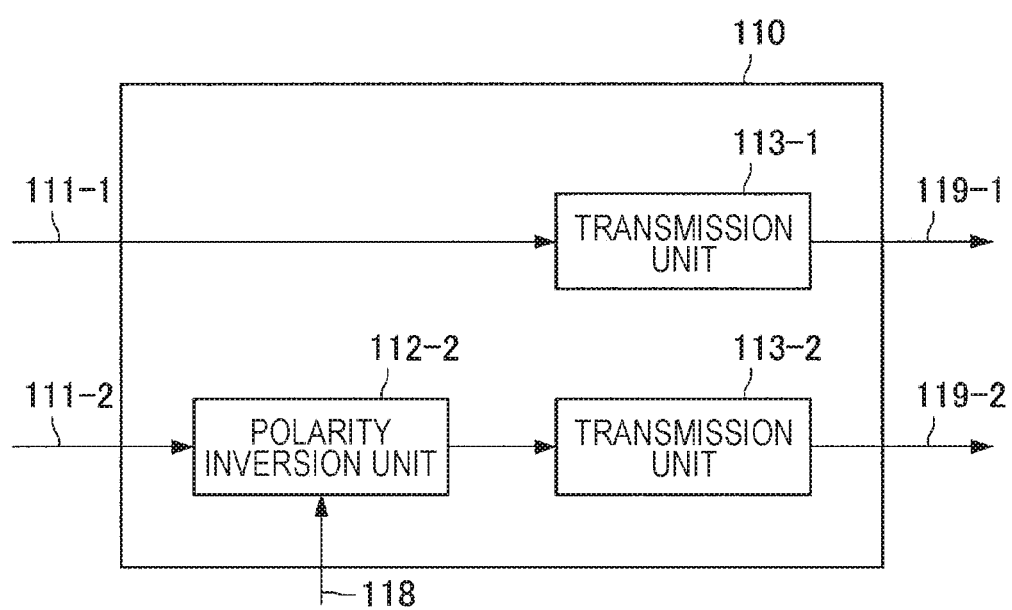
FIG. 12 is a diagram illustrating a configuration example of a transmitter according to the third embodiment.

Subsequently, a configuration will be described of the transmission device 10C. FIG. 12 is a diagram illustrating a configuration example of the transmitter 110 according to the third embodiment. As illustrated in FIG. 12, the transmitter 110 according to the third embodiment includes a polarity inversion unit 112-2 instead of the polarity inversion unit 112-1. Transmission control unit 140-2 controls, with a polarity inversion control signal 118, whether or not to enable polarity inversion by the polarity inversion unit 112-2 in each of the transmitters 110-1 to 110-M, depending on whether or not the polarity inversion detection pattern is transmitted.

More specifically, the transmission control unit 140-2 outputs the polarity inversion detection pattern output start instruction signal to the signal generation unit 150, and then outputs a polarity inversion start instruction signal to the polarity inversion unit 112-2. The polarity inversion unit 112-2 starts polarity inversion in accordance with the polarity inversion start instruction signal. On the other hand, the transmission control unit 140-2 outputs the polarity inversion detection pattern output stop instruction signal to the signal generation unit 150, and then outputs a polarity inversion stop instruction signal to the polarity inversion unit 112-2. The polarity inversion unit 112-2 stops the polarity inversion in accordance with the polarity inversion stop instruction signal.

(3-3. Configuration of Reception Device)

Figure 13:
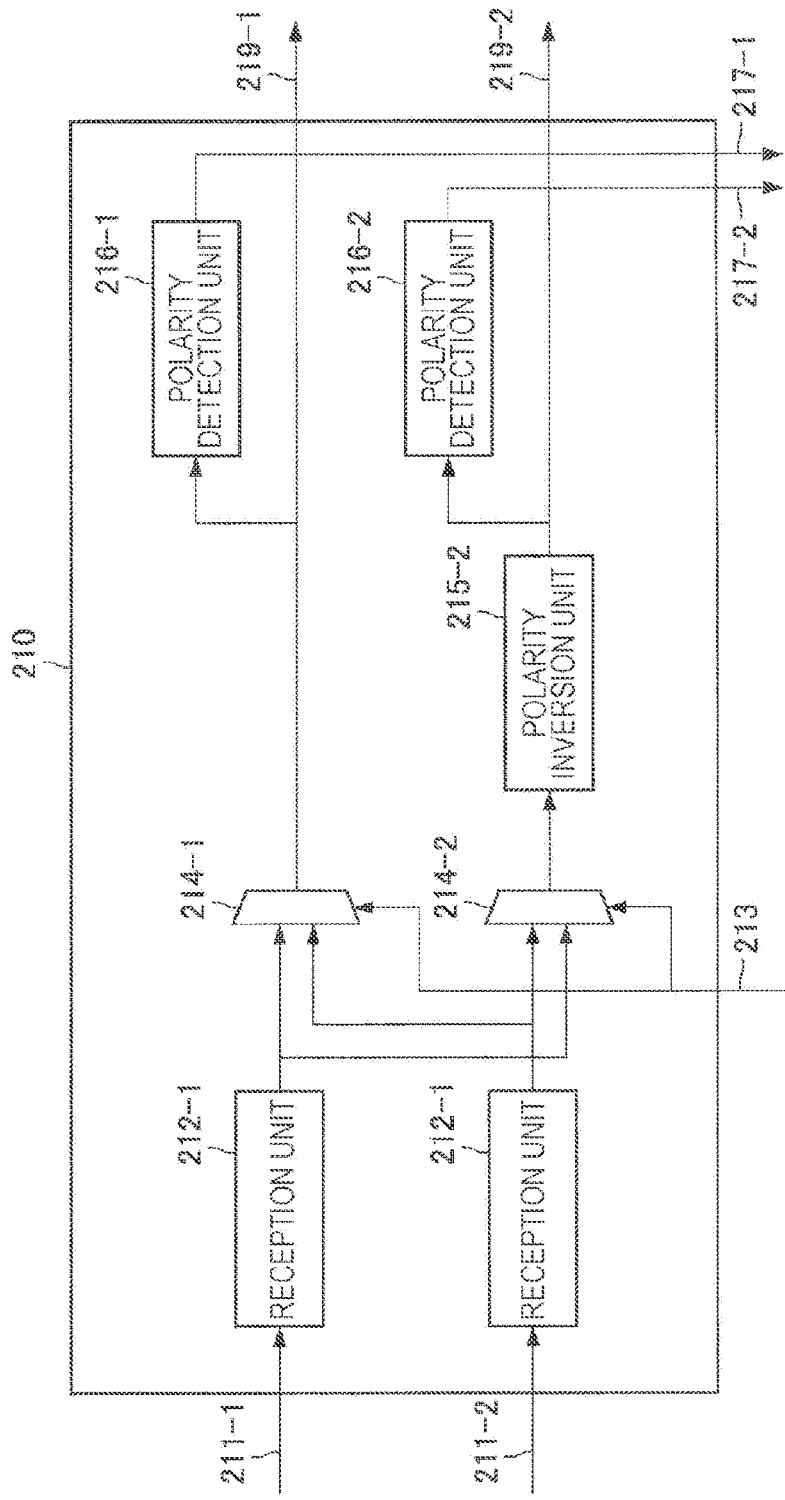
FIG. 13 is a diagram illustrating a configuration example of a receiver according to the third embodiment.

Subsequently, a configuration will be described of the reception device 20C. FIG. 13 is a diagram illustrating a configuration example of the receiver 210 according to the third embodiment. As illustrated in FIG. 13, the receiver 210 according to the third embodiment includes a polarity inversion unit 215-2 instead of the polarity inversion unit 215-1. The reception control unit 240-2 controls whether or not to enable polarity inversion by the polarity inversion unit 215-2, depending on whether or not the polarity determination result signal is detected.

More specifically, the reception control unit 240-2 detects the polarity determination result signal from the receivers 210-1 to 210-M, and then outputs the polarity inversion start instruction signal to the polarity inversion unit 215-2. The polarity inversion unit 215-2 starts polarity inversion in accordance with the polarity inversion start instruction signal. On the other hand, in a case where the polarity determination result signal is not detected from the receivers 210-1 to 210-M, the reception control unit 240-2 outputs the polarity inversion stop instruction signal to the polarity inversion unit 215-2. The polarity inversion unit 215-2 stops the polarity inversion in accordance with the polarity inversion stop instruction signal.

(3-4. Description of Effect)

As described above, according to the third embodiment of the present disclosure, polarity inversion is performed only in a case where polarity detection is performed after connection detection is performed. Therefore, according to the third embodiment of the present disclosure, since polarity inversion is performed only when necessary, it becomes possible to reduce the amount of power consumed in the transmission device 10C and the reception device 20C.

4. Conclusion

As described above, according to the embodiment of the present disclosure, the reception device (reception control device) 20A is provided including: the polarity detection unit 216 that detects, as the polarity determination result signal, at least one of the polarity of the first reception signal received by the reception unit 212-1 or the polarity of the polarity inversion result of the second reception signal received by the reception unit 212-2; and the reception control unit 240-1 that controls output destinations of the third reception signal received after the first reception signal by the reception unit 212-1 and the fourth reception signal received after the second reception signal by the reception unit 212-2, on the basis of the polarity detection result signal.

With this configuration, it becomes possible to support the reverse connection in which the front and back of the connector are reversed while the expansion of the circuit scale is suppressed. More specifically, according to the embodiments of the present disclosure, it becomes possible to support the reverse connection without requiring addition of the reverse connection detection lane, and to support the reverse connection without using the differential signal.

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

For example, each functional block included in the transmission device 10 may be implemented in a separate integrated circuit (IC), or any combination may be implemented in the same IC. Furthermore, for example, each functional block included in the reception device 20 may be implemented in a separate IC, or any combination may be implemented in the same IC.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above effects.

Note that, the following configurations also belong to the technical scope of the present disclosure.

(1)

A reception control device including:
a polarity detection unit that detects, as a polarity determination result signal, at least one of a polarity of a first reception signal received by a first reception unit or a polarity of a polarity inversion result of a second reception signal received by a second reception unit; and
a reception control unit that controls output destinations of a third reception signal received after the first reception signal by the first reception unit and a fourth reception signal received after the second reception signal by the second reception unit, on the basis of the polarity determination result signal.

(2)

The reception control device according to (1), in which
either normal connection or reverse connection is available, the normal connection being connection in which a first transmission unit is connected to the first reception unit and a second transmission unit is connected to the second reception unit, the reverse connection being connection in which the second transmission unit is connected to the first reception unit and the first transmission unit is connected to the second reception unit.

(3)

The reception control device according to (1) or (2), in which
the reception control unit performs control such that the third reception signal is output to a first output port and the fourth reception signal is output to a second output port, in a case where the polarity determination result signal indicates no polarity inversion.

(4)

The reception control device according to (3), in which
the reception control unit performs control such that the third reception signal is output to the second output port and the fourth reception signal is output to the first output port, in a case where the polarity determination result signal indicates polarity inversion.

(5)

The reception control device according any one of (1) to (4), further including
a polarity inversion unit that inverts a polarity of the second reception signal to obtain the polarity inversion result of the second reception signal.

(6)

The reception control device according to (5), in which
the polarity inversion unit inverts a polarity of the fourth reception signal in a case where the polarity determination result signal indicates no polarity inversion, and inverts a polarity of the third reception signal in a case where the polarity determination result signal indicates polarity inversion.

(7)

The reception control device according to any one of (1) to (6), in which
each of the first reception signal and the second reception signal includes a polarity inversion detection pattern, and
the polarity detection unit detects the polarity on the basis of the polarity inversion detection pattern included in at least one of the first reception signal or the second reception signal.

(8)

The reception control device according to (7), in which
the polarity inversion detection pattern includes a predetermined signal whose corresponding code changes before and after polarity inversion, and
the polarity detection unit detects the polarity on the basis of whether or not the code corresponding to the predetermined signal has changed.

(9)

The reception control device according to (7), in which
the polarity inversion detection pattern includes a predetermined pulse signal pattern, and
the polarity detection unit detects the polarity on the basis of whether or not the predetermined pulse signal pattern is inverted in polarity.

(10)

The reception control device according to (9), in which
the predetermined pulse signal pattern is a pattern not included in a signal obtained by connecting together and inverting a plurality of the predetermined pulse signal patterns.

(11)

The reception control device according to (2), further including
a connection detection unit that detects the connection, in which
the polarity detection unit detects the polarity determination result signal in a case where the connection is detected, and
the reception control unit controls output destinations of the third reception signal and the fourth reception signal in a case where the connection is detected.

(12)

The reception control device according to (11), in which
each of the first reception signal and the second reception signal includes a polarity inversion detection pattern,
the polarity inversion detection pattern includes a fixed signal after the connection is detected, and the polarity detection unit detects the polarity on the basis of whether or not the fixed signal is inverted in polarity.

(13)

The reception control device according to (5) or (6), in which the reception control unit controls whether or not to enable polarity inversion by the polarity inversion unit, depending on whether or not the polarity determination result signal is detected.

(14)

A transmission control device including:

a first transmission unit that transmits a first transmission signal; and a second transmission unit that transmits a polarity inversion result of a second transmission signal, in which output destinations of the first transmission signal and the second transmission signal in a reception device are controlled on the basis of at least one of a polarity of the first transmission signal or a polarity of the polarity inversion result of the second transmission signal.

(15)

The transmission control device according to (14), in which either normal connection or reverse connection is available, the normal connection being connection in which a first reception unit is connected to the first transmission unit and a second reception unit is connected to the second transmission unit, the reverse connection being connection in which the second reception unit is connected to the first transmission unit and the first reception unit is connected to the second transmission unit.

(16)

The transmission control device according to (15), further including a polarity inversion unit that inverts a polarity of the second transmission signal to obtain the polarity inversion result of the second transmission signal.

(17)

The transmission control device according to (16), further including:

a connection detection unit that detects the connection; and a transmission control unit that includes a polarity inversion detection pattern in at least one of the first transmission signal or the second transmission signal in a case where the connection is detected.

(18)

The transmission control device according to (17), in which the transmission control unit controls whether or not to enable polarity inversion by the polarity inversion unit, depending on whether or not the polarity inversion detection pattern is transmitted.

(19)

A transmission/reception control system including:

a transmission control device including a first transmission unit that transmits a first transmission signal, and a second transmission unit that transmits a polarity inversion result of a second transmission signal; and a reception control device including a polarity detection unit that detects, as a polarity determination result signal, at least one of a polarity of a first reception signal received by a first reception unit or a polarity of a polarity inversion result of a second reception signal received by a second reception unit, and a reception control unit that controls output destinations of a third reception signal received after the first reception signal by the first reception unit and a fourth reception signal received after the second reception signal by the second reception unit, on the basis of the polarity determination result signal.

(20)

The transmission/reception control system according to (19), in which either normal connection or reverse connection is available, the normal connection being connection in which the first reception unit is connected to the first transmission unit and the second reception unit is connected to the second transmission unit, the reverse connection being connection in which the second reception unit is connected to the first transmission unit and the first reception unit is connected to the second transmission unit.

REFERENCE SIGNS LIST (1A to 1C) Signal transmission system
(10A to 10C) Transmission device
110 Transmitter
111 Input port
112 Polarity inversion unit
113 Transmission unit
119 Output port
120 Switch
130 Connection detection unit
140 Transmission control unit
150 Signal generation unit
190 Receptor
20 (20A to 20C) Reception device
210 Receiver
211 Input port
212 Reception unit
213 Exchange control signal
214 Switch
215 Polarity inversion unit
216 Polarity detection unit
217 Polarity determination result signal
219 Output port
230 Connection detection unit
240 Reception control unit
290 Receptor
30 Transmission line
305 Lane

The invention claimed is:

1. A reception control device, comprising:
a first reception circuit configured to receive a first reception signal;
a second reception circuit configured to receive a second reception signal, wherein
the first reception circuit is further configured to receive a third reception signal after the reception of the first reception signal, and
the second reception circuit is further configured to receive a fourth reception signal after the reception of the second reception signal; and
circuitry configured to:
invert a polarity of the received second reception signal to obtain a polarity inversion result of the second reception signal;
detect, as a polarity determination result signal, at least one of a polarity of the received first reception signal or a polarity of the polarity inversion result of the second reception signal; and control output destinations of the third reception signal and the fourth reception signal, based on the polarity determination result signal.

2. The reception control device according to claim 1, wherein
the circuitry is further configured to detect one of a normal connection or a reverse connection,
the normal connection is a connection in which a first transmission circuit is connected to the first reception circuit and a second transmission circuit is connected to the second reception circuit, and
the reverse connection is a connection in which the second transmission circuit is connected to the first reception circuit and the first transmission circuit is connected to the second reception circuit.

3. The reception control device according to claim 1, wherein, in a case where the polarity determination result signal indicates no polarity inversion, the circuitry is further configured to:
output the third reception signal to a first output port; and
output the fourth reception signal to a second output port.

4. The reception control device according to claim 3, wherein, in a case where the polarity determination result signal indicates polarity inversion, the circuitry is further configured to:
output the third reception signal to the second output port; and
output the fourth reception signal to the first output port.

5. The reception control device according to claim 1, wherein the circuitry is further configured to:
invert a polarity of the fourth reception signal in a case where the polarity determination result signal indicates no polarity inversion, and
invert a polarity of the third reception signal in a case where the polarity determination result signal indicates polarity inversion.

6. The reception control device according to claim 1, wherein
at least one of the first reception signal or the second reception signal includes a polarity inversion detection pattern, and
the circuitry is further configured to detect each of the polarity of the first reception signal or the polarity of the polarity inversion result of the second reception signal, based on the polarity inversion detection pattern included in at least one of the first reception signal or the second reception signal.

7. The reception control device according to claim 6, wherein
the polarity inversion detection pattern includes a signal whose corresponding code changes before and after polarity inversion, and
the circuitry is further configured to detect each of the polarity of the first reception signal or the polarity of the polarity inversion result of the second reception signal, based on whether the code corresponding to the signal has changed.

8. The reception control device according to claim 6, wherein
the polarity inversion detection pattern includes a pulse signal pattern, and
the circuitry is further configured to detect each of the polarity of the first reception signal and the polarity of the polarity inversion result of the second reception signal, based on whether the pulse signal pattern is inverted in polarity.

9. The reception control device according to claim 8, wherein the pulse signal pattern is a pattern not included in a signal obtained by connecting together and inverting a plurality of pulse signal patterns.

10. The reception control device according to claim 2, wherein the circuitry is further configured to:
detect the polarity determination result signal in a case where one of the normal connection or the reverse connection is detected, and
control the output destinations of the third reception signal and the fourth reception signal in a case where one of the normal connection or the reverse connection is detected.

11. The reception control device according to claim 10, wherein
each of the first reception signal and the second reception signal includes a polarity inversion detection pattern,
the polarity inversion detection pattern includes a fixed signal after one of the normal connection or the reverse connection is detected, and
the circuitry is further configured to detect each of the polarity of the first reception signal and the polarity of the polarity inversion result of the second reception signal, based on whether the fixed signal is inverted in polarity.

12. The reception control device according to claim 1, wherein the circuitry is further configured to enable polarity inversion based on whether the polarity determination result signal is detected.

13. A transmission control device, comprising:
a first transmission circuit configured to transmit a first transmission signal;
a second transmission circuit configured to transmit a polarity inversion result of a second transmission signal; and
circuitry configured to include a polarity inversion detection pattern in at least one of the first transmission signal or the second transmission signal in a case where one of a normal connection or a reverse connection is detected between the transmission control device and a reception device, wherein
the reception device includes a first reception circuit and a second reception circuit,
in the normal connection, the first reception circuit is connected to the first transmission circuit and the second reception circuit is connected to the second transmission circuit, and
in the reverse connection, the second reception circuit is connected to the first transmission circuit and the first reception circuit is connected to the second transmission circuit.

14. The transmission control device according to claim 13, wherein the circuitry is further configured to invert a polarity of the second transmission signal to obtain the polarity inversion result of the second transmission signal.

15. The transmission control device according to claim 14, wherein the circuitry is further configured to detect one of the normal connection or the reverse connection.

16. The transmission control device according to claim 15, wherein the circuitry is further configured to enable polarity inversion based on whether the polarity inversion detection pattern is transmitted.

17. A transmission/reception control system, comprising:
a first transmission circuit configured to transmit a first transmission signal;

a second transmission circuit configured to transmit a polarity inversion result of a second transmission signal;

a first reception circuit configured to receive a first reception signal from the first transmission circuit;

a second reception circuit configured to receive a second reception signal from the second transmission circuit, wherein the first reception circuit is further configured to receive a third reception signal after the reception of the first reception signal, and the second reception circuit is further configured to receive a fourth reception signal after the reception of the second reception signal; and reception control circuitry configured to:

invert a polarity of the received second reception signal to obtain a polarity inversion result of the second reception signal;

detect, as a polarity determination result signal, at least one of a polarity of the received first reception signal or a polarity of the polarity inversion result of the second reception signal; and control output destinations of the third reception signal and the fourth reception signal, based on the polarity determination result signal.

18. The transmission/reception control system according to claim 17, wherein the reception control circuitry is further configured to detect one of a normal connection or a reverse connection, the normal connection is a connection in which the first reception circuit is connected to the first transmission circuit and the second reception circuit is connected to the second transmission circuit, and the reverse connection is a connection in which the second reception circuit is connected to the first transmission circuit and the first reception circuit is connected to the second transmission circuit.

* * * * *